US008219660B2

(12) United States Patent
McCoy et al.

(10) Patent No.: US 8,219,660 B2
(45) Date of Patent: Jul. 10, 2012

(54) SIMULTANEOUS CONNECTIVITY AND MANAGEMENT ACROSS MULTIPLE BUILDING AUTOMATION SYSTEM NETWORKS

(75) Inventors: Sean M. McCoy, Maple Grove, MN (US); Shane M. Gydesen, Stillwater, MN (US); Weiwei Sun, Woodbury, MN (US); David M. Richards, Andover, MN (US)

(73) Assignee: Trane International Inc., Piscataway, NJ (US)

( * ) Notice: Subject to any disclaimer, the term of this patent is extended or adjusted under 35 U.S.C. 154(b) by 206 days.

(21) Appl. No.: 12/714,433

(22) Filed: Feb. 26, 2010
(Under 37 CFR 1.47)

(65) Prior Publication Data
US 2011/0213867 A1 Sep. 1, 2011

(51) Int. Cl.
*G06F 15/16* (2006.01)
(52) U.S. Cl. .......... 709/223; 709/217; 709/227
(58) Field of Classification Search .......... 709/200–203, 709/217–227
See application file for complete search history.

(56) References Cited

U.S. PATENT DOCUMENTS

| 5,311,451 | A | 5/1994 | Barrett |
| 5,321,603 | A | 6/1994 | Schwenke |
| 5,384,697 | A | 1/1995 | Pascucci |
| 5,444,851 | A | 8/1995 | Woest |
| 5,463,735 | A | 10/1995 | Pascucci et al. |
| 5,511,188 | A | 4/1996 | Pascucci et al. |
| 5,522,044 | A | 5/1996 | Pascucci et al. |
| 5,550,980 | A | 8/1996 | Pascucci et al. |
| 5,559,955 | A | 9/1996 | Dev et al. |
| 5,598,566 | A | 1/1997 | Pascucci et al. |
| 5,761,432 | A | 6/1998 | Bergholm |
| 5,805,442 | A | 9/1998 | Crater et al. |
| 5,884,072 | A | 3/1999 | Rasmussen |
| 5,982,362 | A | 11/1999 | Crater et al. |
| 5,999,179 | A | 12/1999 | Kekic |
| 6,028,998 | A | 2/2000 | Gloudeman et al. |
| 6,067,477 | A | 5/2000 | Waewalaarachchi et al. |
| 6,098,116 | A | 8/2000 | Nixon et al. |
| 6,104,963 | A | 8/2000 | Cabasek et al. |

(Continued)

FOREIGN PATENT DOCUMENTS

CN 101589351 A 6/2008

(Continued)

OTHER PUBLICATIONS

"BACnet, LonWorks War Continues for BAS Manufacturers", p. 14, Mar. 10, 1997 Issue of Air Conditioning, Heating & Refrigerations News, 1 pg.

(Continued)

*Primary Examiner* — Moustafa M Meky
(74) *Attorney, Agent, or Firm* — Patterson Thuente Christensen Pedersen, P.A.

(57) ABSTRACT

A building automation system (BAS) network manager supporting a plurality of device protocols coupled to at least one communication network, and a plurality of logical connections to individual BAS networks to multiple end devices of a BAS. The BAS network manager can communicate with each of the end devices regardless of the protocol or protocol version of the BAS network by implementing a protocol stack above the link layer for each protocol or protocol version, providing an integrated multi-BAS network interface, and maintaining a device identifier for each BAS network the network manager is coupled to in the protocol stack.

7 Claims, 8 Drawing Sheets

U.S. PATENT DOCUMENTS

| | | | |
|---|---|---|---|
| 6,115,713 A | 9/2000 | Pascucci et al. | |
| 6,119,125 A | 9/2000 | Gloudeman et al. | |
| 6,141,595 A | 10/2000 | Gloudeman et al. | |
| 6,145,751 A | 11/2000 | Ahmed | |
| 6,148,355 A | 11/2000 | Mahalingam | |
| 6,154,681 A | 11/2000 | Drees et al. | |
| 6,157,943 A | 12/2000 | Meyer | |
| 6,167,316 A | 12/2000 | Gloudeman et al. | |
| 6,240,326 B1 | 5/2001 | Gloudeman et al. | |
| 6,241,156 B1 | 6/2001 | Kline et al. | |
| 6,263,387 B1 | 7/2001 | Chrabaszcz | |
| 6,266,726 B1 | 7/2001 | Nixon et al. | |
| 6,334,107 B1 | 12/2001 | Gale et al. | |
| 6,353,853 B1 | 3/2002 | Gravlin | |
| 6,389,331 B1 | 5/2002 | Jensen et al. | |
| 6,405,103 B1 | 6/2002 | Ryan et al. | |
| 6,487,457 B1 | 11/2002 | Hull et al. | |
| 6,496,893 B1 | 12/2002 | Arai | |
| 6,580,950 B1 | 6/2003 | Johnson et al. | |
| 6,584,095 B1 | 6/2003 | Jacobi et al. | |
| 6,584,096 B1 | 6/2003 | Allan | |
| 6,598,056 B1 | 7/2003 | Hull et al. | |
| 6,636,893 B1 | 10/2003 | Fong | |
| 6,708,505 B2 | 3/2004 | Nakamura et al. | |
| 6,714,977 B1 | 3/2004 | Fowler et al. | |
| 6,832,120 B1 | 12/2004 | Frank et al. | |
| 6,834,298 B1 | 12/2004 | Singer | |
| 6,874,691 B1* | 4/2005 | Hildebrand et al. | 236/51 |
| 6,925,571 B1 | 8/2005 | Motoyama | |
| 6,999,824 B2 | 2/2006 | Glanzer et al. | |
| 7,010,796 B1 | 3/2006 | Strom et al. | |
| 7,065,769 B1 | 6/2006 | Tolopka | |
| 7,080,142 B2 | 7/2006 | Galloway et al. | |
| 7,136,914 B2 | 11/2006 | Motoyama | |
| 7,165,109 B2 | 1/2007 | Chiloyan et al. | |
| 7,194,537 B2 | 3/2007 | Motoyama | |
| 7,206,791 B2 | 4/2007 | Hind et al. | |
| 7,240,106 B2 | 7/2007 | Cochran et al. | |
| 7,246,162 B2 | 7/2007 | Tindal | |
| 7,249,170 B2 | 7/2007 | Tindal et al. | |
| 7,250,856 B2 | 7/2007 | Havekost et al. | |
| 7,251,534 B2 | 7/2007 | Walls et al. | |
| 7,275,079 B2 | 9/2007 | Brodsky et al. | |
| 7,287,085 B1 | 10/2007 | Motoyama | |
| 7,287,257 B2 | 10/2007 | Meza | |
| 7,289,995 B2 | 10/2007 | Motoyama et al. | |
| 7,293,253 B1 | 11/2007 | Soukup | |
| 7,296,079 B2 | 11/2007 | Motoyama | |
| 7,302,469 B2 | 11/2007 | Motoyama | |
| 7,320,023 B2 | 1/2008 | Chintalapati | |
| 7,337,242 B1 | 2/2008 | Motoyama | |
| 7,349,761 B1 | 3/2008 | Cruse | |
| 7,392,310 B2 | 6/2008 | Motoyama | |
| 7,421,474 B2 | 9/2008 | Motoyama | |
| 7,433,740 B2* | 10/2008 | Hesse et al. | 700/1 |
| 7,437,452 B2 | 10/2008 | Motoyama | |
| 7,437,596 B2 | 10/2008 | McFarland | |
| 7,447,766 B2 | 11/2008 | Motoyama | |
| 7,500,003 B2 | 3/2009 | Motoyama | |
| 7,502,848 B2 | 3/2009 | Motoyama | |
| 7,506,048 B1 | 3/2009 | Motoyama | |
| 7,512,450 B2 | 3/2009 | Ahmed | |
| 7,519,698 B2 | 4/2009 | Motoyama | |
| 7,533,167 B2 | 5/2009 | Motoyama | |
| 7,533,333 B2 | 5/2009 | Motoyama | |
| 7,536,450 B2 | 5/2009 | Motoyama | |
| 7,574,503 B2 | 8/2009 | Motoyama | |
| 7,606,894 B2 | 10/2009 | Motoyama | |
| 7,610,372 B2 | 10/2009 | Motoyama | |
| 7,610,374 B2 | 10/2009 | Motoyama | |
| 7,634,555 B1 | 12/2009 | Wainscott, Jr. et al. | |
| 7,647,397 B2 | 1/2010 | Motoyama | |
| 7,650,323 B2* | 1/2010 | Hesse et al. | 706/62 |
| 7,765,289 B2 | 7/2010 | Park | |
| 7,765,826 B2 | 8/2010 | Nichols | |
| 7,870,090 B2 | 1/2011 | McCoy et al. | |
| 7,904,186 B2 | 3/2011 | Mairs et al. | |
| 7,917,232 B2 | 3/2011 | McCoy et al. | |
| 8,024,054 B2 | 9/2011 | Mairs et al. | |
| 8,050,801 B2 | 11/2011 | Richards et al. | |
| 8,055,386 B2 | 11/2011 | McCoy et al. | |
| 8,055,387 B2 | 11/2011 | McCoy et al. | |
| 8,099,178 B2 | 1/2012 | Mairs et al. | |
| 2002/0016639 A1 | 2/2002 | Smith et al. | |
| 2002/0029096 A1 | 3/2002 | Takai et al. | |
| 2002/0042845 A1 | 4/2002 | Burmann et al. | |
| 2002/0136203 A1 | 9/2002 | Liva | |
| 2002/0152028 A1 | 10/2002 | Motoyama | |
| 2002/0152292 A1 | 10/2002 | Motoyama | |
| 2003/0084176 A1 | 5/2003 | Tewari et al. | |
| 2003/0135765 A1 | 7/2003 | Hind et al. | |
| 2003/0158975 A1 | 8/2003 | Frank et al. | |
| 2003/0159129 A1 | 8/2003 | Frank et al. | |
| 2003/0167323 A1 | 9/2003 | Motoyama | |
| 2004/0059808 A1 | 3/2004 | Galloway et al. | |
| 2004/0075549 A1 | 4/2004 | Haller | |
| 2004/0143510 A1 | 7/2004 | Haeberle et al. | |
| 2004/0148288 A1 | 7/2004 | Haeberle et al. | |
| 2004/0176877 A1* | 9/2004 | Hesse et al. | 700/276 |
| 2004/0215694 A1 | 10/2004 | Podolsky | |
| 2004/0215740 A1 | 10/2004 | Frank et al. | |
| 2004/0230323 A1 | 11/2004 | Glanzer et al. | |
| 2004/0243988 A1 | 12/2004 | Ota | |
| 2004/0249913 A1 | 12/2004 | Kaufman | |
| 2004/0254915 A1 | 12/2004 | Motoyama | |
| 2004/0255023 A1 | 12/2004 | Motoyama | |
| 2005/0071483 A1 | 3/2005 | Motoyama | |
| 2005/0090915 A1 | 4/2005 | Geiwitz | |
| 2005/0119767 A1* | 6/2005 | Kiwimagi et al. | 700/19 |
| 2005/0120223 A1* | 6/2005 | Kiwimagi et al. | 713/182 |
| 2005/0120240 A1* | 6/2005 | Kiwimagi et al. | 713/201 |
| 2005/0177642 A1 | 8/2005 | Motoyama | |
| 2005/0288823 A1* | 12/2005 | Hesse et al. | 700/276 |
| 2006/0010232 A1 | 1/2006 | Page et al. | |
| 2006/0047787 A1 | 3/2006 | Agarwal et al. | |
| 2006/0058923 A1 | 3/2006 | Kruk et al. | |
| 2006/0130107 A1 | 6/2006 | Gonder et al. | |
| 2006/0155824 A1 | 7/2006 | Motoyama et al. | |
| 2006/0184659 A1 | 8/2006 | Motoyama et al. | |
| 2007/0005736 A1 | 1/2007 | Hansen et al. | |
| 2007/0043476 A1 | 2/2007 | Richards et al. | |
| 2007/0055698 A1 | 3/2007 | McCoy et al. | |
| 2007/0055756 A1* | 3/2007 | Richards et al. | 709/223 |
| 2007/0055757 A1 | 3/2007 | Mairs et al. | |
| 2007/0055758 A1 | 3/2007 | McCoy et al. | |
| 2007/0055759 A1 | 3/2007 | McCoy et al. | |
| 2007/0055760 A1 | 3/2007 | McCoy et al. | |
| 2007/0061046 A1 | 3/2007 | Mairs et al. | |
| 2007/0067062 A1 | 3/2007 | Mairs et al. | |
| 2007/0232288 A1* | 10/2007 | McFarland et al. | 455/423 |
| 2007/0261062 A1 | 11/2007 | Bansal et al. | |
| 2008/0281472 A1 | 11/2008 | Podgorny et al. | |
| 2009/0065596 A1* | 3/2009 | Seem et al. | 236/51 |
| 2009/0083416 A1 | 3/2009 | Nass et al. | |
| 2009/0105846 A1* | 4/2009 | Hesse et al. | 700/1 |
| 2010/0228805 A1 | 9/2010 | McCoy et al. | |
| 2011/0047259 A1 | 2/2011 | Sato et al. | |
| 2011/0047418 A1 | 2/2011 | Drees et al. | |
| 2011/0131336 A1 | 6/2011 | Wang et al. | |
| 2011/0208803 A1 | 8/2011 | McCoy et al. | |
| 2011/0213502 A1 | 9/2011 | Uden | |

FOREIGN PATENT DOCUMENTS

| | | |
|---|---|---|
| CN | 101427239 A | 5/2009 |
| CN | 101632050 A | 1/2010 |
| GB | 2444451 A | 6/2008 |
| GB | 2445489 A | 7/2008 |
| GB | 2445686 A | 7/2008 |
| GB | 2465506 A | 5/2010 |
| WO | WO2007/024573 A2 | 3/2007 |
| WO | WO2007/024622 A2 | 3/2007 |
| WO | WO2007/024623 A2 | 3/2007 |
| WO | WO2010/096313 A2 | 8/2010 |

OTHER PUBLICATIONS

"Controls Companies See Opportunities on Internet", Mar. 1, 1997 Issue of Energy User News, 4 pgs.

Tracer Summit Web Server, Dated Mar. 2003, Document No. BAS-PRC014-EN, 13 pgs.
"Infinity WebServer" brochure, Copyright 1997 by Andover Controls Corporation, Document No. DS-WEBSVR-A, 2 pgs.
"Facility Management Unleashed: web.Client", Copyright 2002 by Andover Controls, Document No. BR-WC-A, 6 pgs.
"Building Automation Systems on the Internet", by Albert T.P. So, W.L. Chan and W.L. Tse, May/Jun. 1997 Issue of Facilities Magazine, vol. 15, No. 5/6, pp. 125-133.
"Connecting LonWorks and TCP/IP Enterprise Networks-Real Application Successes", by Coactive Aesthetics, dated 1997, 9 pgs.
"Remote Building Monitoring and Control", an ACEEE paper, dated Jul. 18, 1996, 13 pgs.
Remote Building Control Using the Internet,: by Edward Finch, Dec. 1998 Issue of Facilities Magazine, vol. 15—No. 12/13, pp. 356-360.
"Marketing Tracer Summit", a marketing guide dated Jan. 1998, Order No. BAS-MG-46, 12 pgs.
"Tracer Summit Users Network", a marketing guide dated Mar. 2002, Order No. BAS-SLM005-EN, 12 pgs.
Marketing the Tracer ZN.511 and ZN.521 Zone Controllers, a marketing guide dated Feb. 2001, Order No. BAS-SLM008-EN, 12 pgs.
http://www.nettedautomation.com/glossary_menue/glossy_r.html—The Net is the Automation, Netted Automation GmbH, Information and Communication Systems (NAICS), 2000-2002, composed by John Black, Web page—http://www.nettedautomation.com/glossary_menue/glossy_r.html, printed Jan. 20, 2008, 2pgs.
"An Efficient Execution Model for Dynamically Reconfigurable Component Software"; Andreas Gal, Peter H. Frohlich, Michael Franz; Department of Information and Computer Science—University of California, Irvine; May 31, 2002; pp. 1-7; http://research.microsoft.com/~cszypers/events/WCOP2002/10_Gal.pdf.
Microsoft Computer Dictionary, Fifth Edition, "Server" definition, Published: 2002, Publisher: Microsoft Press, p. 474.
personalSCADA 2.0 User's Guide, Eutech Cybernetics Pte Ltd., 2002, 401 pgs.
"Tracer Summit, Building Automation System," TRANE, Doc #BAS-PRC001-EN, Aug. 2002, 20 pgs.
*Enterprise Buildings Integrator R310*, Specification Data, Honeywell, Mar. 2003, pp. 1-20.

* cited by examiner

| | Network A Stack | Network B Stack | Network C Stack | Network D Stack |
|---|---|---|---|---|
| ESE DEV ID | 1:100 | 1:47 | 1:101 | 1:10 |
| PEERS | 1:1 | 1:99 | 1:1 | |
| | 1:2 | 1:20 | 1:99 | |
| | 1:43 | 2:99 | | |
| | | 2:21 | | |
| | | 2:47 | | |
| | | | | |

FIG. 6

SIMULTANEOUS CONNECTIVITY AND MANAGEMENT ACROSS MULTIPLE BUILDING AUTOMATION SYSTEM NETWORKS

FIELD OF THE INVENTION

The present invention relates generally to building automation system networks. More particularly, the present invention relates generally to the integration, utilization and coordination of multiple networks protocols or protocol versions installed in conjunction with multiple building automation systems.

BACKGROUND OF THE INVENTION

Building Automation Systems (BAS) are used to coordinate, manage, and automate control of diverse environmental, physical, and electrical building subsystems, particularly HVAC and climate control but also including security, lighting, power, and the like. Typical existing BAS systems are hardwired or use a proprietary communication standard or protocol to link the various subsystems and provide system-wide user access, monitoring, and control. A BAS may comprise a plurality of end devices, a communication network, a server engine, and a graphical user interface (GUI) or other means of providing control and reporting data to a user. The end devices are each typically associated with a room, a space, a system, or a subsystem for at least a portion of a building or a campus. The BAS communication network may support a plurality of communication protocols and communicatively couples end devices to the server engine. One such communication network standard is the ANSI/ASHRAE Standard 135-2008, or more generally BACnet™. Multiple versions of the BACnet™ standard exist and are known to those skilled in the art of building automation and control networks. BACnet™ was intended to standardize HVAC interoperability and serve as a solution to industry-wide issues. The BACnet standard specifies a variety of networking technologies including Ethernet, ARCNET, an EIA-485 master/slave token passing scheme, and IP (UDP). In use, however, BACnet™ exists in multiple versions and includes various non-standard feature functions available to vendors. Many vendors dictate a particular BACnet™ version that must be used in order to achieve system compliance, forcing BAS users to update networks or equipment in order to expand. BACnet™ is therefore not completely interoperable across versions and features.

A BACnet™ compatible device such as an embedded controller or a properly equipped personal computer is assigned a unique identifier for the individual network. An end device is normally a member of only one BACnet™ network. End devices generally include only a minimal level of computing power and typically need to be backward compatible with older devices that can be present in an existing installation. MAC addresses in typical networks are used to individually identify devices such that every single computing device has a unique MAC address. Unlike a MAC address that is typically set by a manufacturer during production and are used to coordinate devices at a data link layer, a device's BACnet™ identifier, or device instance, is assigned at the logical network layer when the device becomes a member of a network. A device identifier, called a device instance, must be unique within a BACnet™ network.

BAS network topologies can vary greatly. For example, a large retail company could have hundreds of stores, each with a single BAS network connecting all of the systems in each store. Examples of the types of systems in a store could include devices to collect pressures, temperatures, humidity level, power/energy readings, and other run-time statistics; as well as controls for each of these environmental, security, lighting, or other systems. Alternatively, a university could have a single BAS network connecting each end device located throughout dozens of buildings on a single campus. Each of these network topologies depicts a single network connecting multiple devices in one or more buildings. On the opposite side of the topology spectrum, a high-rise building could be configured such that each end device or controller for an individual floor, or a small number of adjacent floors occupied by a single tenant, is connected to a single BAS network. In this configuration there can be dozens of BAS networks in a single building. Each network topology can provide various advantages by either isolating or comingling together collections of devices into one or more networks.

Existing BAS networks can be difficult and communicatively cumbersome to manage on a large scale, such as by a regional or nationwide retailer or other organization. Further, while Internet-based and accessible systems are presently available and in use, these systems suffer from several drawbacks. Many current Internet-based systems were created as add-ons to existing BAS installations and thus have integrated and proprietary designs. These systems do not offer the adaptability and extensibility necessary to interface with non-native systems and sub-systems, a particular issue with respect to large-scale systems implemented in existing structures. Existing system also do not provide adequate centralized management of multiple BAS networks, especially in the situation where multiple versions of the BACnet™ protocol are in use on different networks.

Accordingly, a need remains for systems and methods capable of integrating, managing, and coordinating multiple BAS networks comprised of a variety of protocols and protocol versions, that can be geographically or logically located across multiple spaces, floors, buildings, campuses or other structures.

SUMMARY OF THE INVENTION

The present invention substantially addresses the aforementioned needs and relates to data harvesting techniques and systems for building automation system (BAS) architectures, and configurations.

In one embodiment, a BAS network manager communicatively coupled to a plurality of BAS networks, in one embodiment comprises a BAS management application that can provide a user interface adapted to receive commands from and display BAS information to an end user, a plurality of BAS network stacks, each stack associated with an individual BAS network and including storage for both a device identifier and a device address binding table unique to each of the plurality of BAS networks.

In one embodiment, a server engine of a BAS can be configured to implement a dynamic BAS network extensibility capability to establish communications with and to control a plurality of devices located on multiple BAS networks. Each BAS network is communicatively coupled to the server engine through a common physical link capable of supporting multiple network addresses and a plurality of BAS network specific protocol stacks each associated with a BAS network.

In one embodiment, a building automation system (BAS) network management system comprising: a plurality of building automation systems including a plurality of devices located in an area defined by a building automation system network, the network communicatively couples each of the plurality of devices to every other of the plurality of devices; a central server engine configured to support multiple BAS network protocols, the central server engine communicatively coupled to each building automation system network; and means for communicating with each of the plurality of devices coupled to each of the building automation system networks with a protocol compatible with each one of the building automation system networks.

In one embodiment, the method comprises obtaining a BAS network device identifier enabling the BAS network manager to become a member device on each of a plurality of BAS networks, each network implemented with one of a variety of network protocols.

In one embodiment, a method of integrating a plurality of building automation system (BAS) networks comprising: communicatively coupling each of the plurality BAS networks to a central server engine; configuring the server engine to communicate with each of the plurality of BAS networks by providing a protocol stack for a BAS network protocol compatible with at least one of the plurality of BAS networks; storing a BAS network device identifier associated with the server engine for the at least one of the plurality of BAS networks in the protocol stack; and storing a device address binding table including the BAS network address of each of a plurality of devices connected to each of the plurality BAS networks in the protocol stack for each of the plurality of BAS networks.

In one embodiment, a method of communicating with a plurality of building automation systems (BAS) each with a BAS network comprising: communicatively coupling each of the plurality BAS networks to a central server engine with a packet based network; implementing a network layer protocol stack for each BAS network protocol of the plurality BAS networks; using the network layer protocol stack for one of the plurality of BAS networks to form a message according to the BAS network protocol corresponding to the one of the plurality of the BAS networks, wherein the message includes at least one destination BAS network address and at least one command instruction as part of a BAS network compatible payload; and causing the message to be transmitted via the packet based network to the at least one destination network address.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 6 is an exemplary diagram of the device identifier and peer device address binding table for multiple BAS protocol stacks according to one embodiment of the invention.

Figure 1:
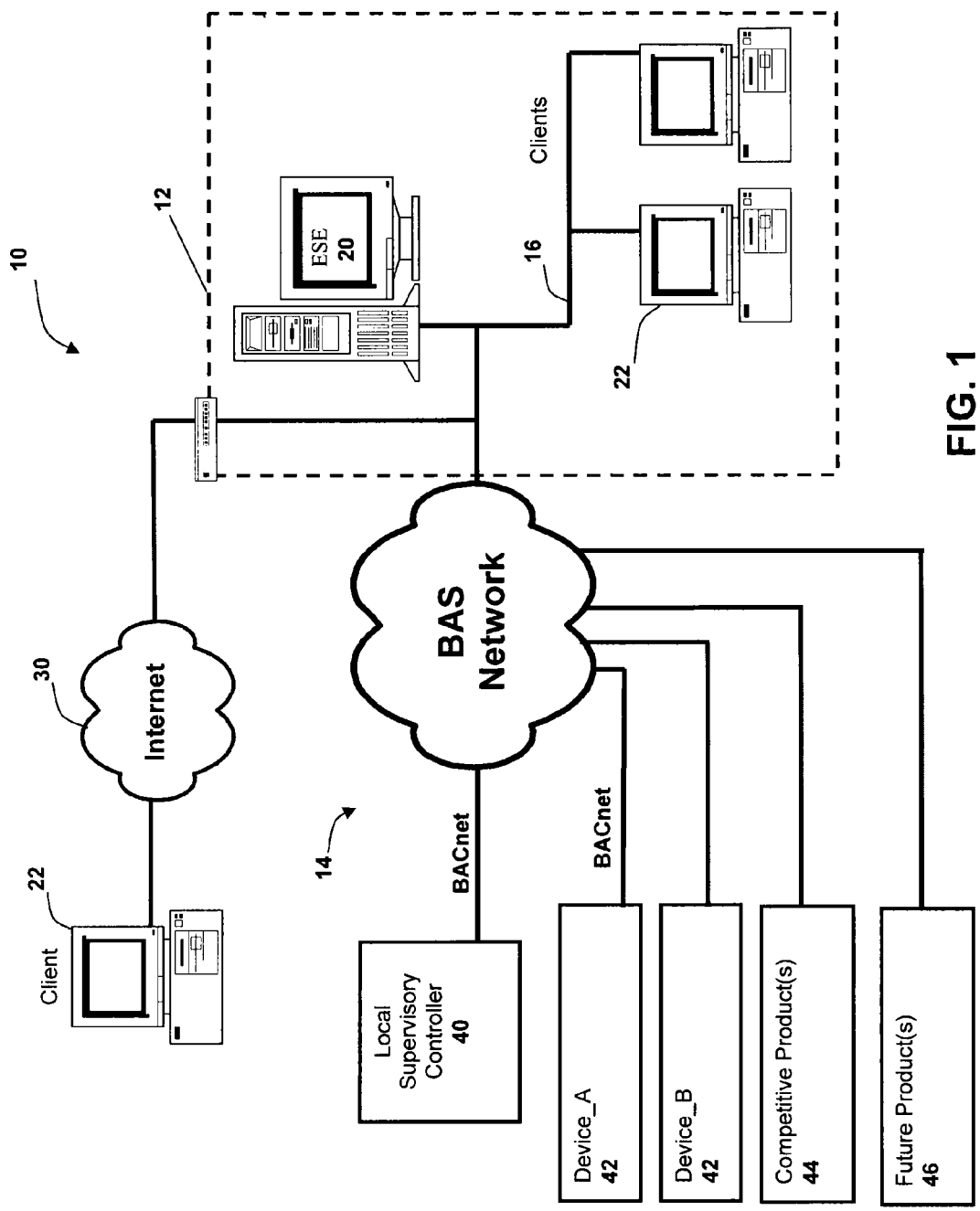
FIG. 1 is a diagram building automation system (BAS) according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The systems and methods of the invention can be utilized in a local or widely distributed building automation system (BAS), from a space or building level to an enterprise level, encompassing virtually any structure, cluster, campus, and area in between. The systems and methods are particularly suited for a dynamically extensible and automatically configurable BAS and architecture, such as those disclosed in U.S. patent application Ser. No. 11/208,773, filed Aug. 22, 2005, entitled "Dynamically Extensible and Automatically Configurable Building Automation System and Architecture"; U.S. patent application Ser. No. 11/316,687, filed Dec. 22, 2005, entitled "Building Automation System Facilitating User Customization"; U.S. patent application Ser. No. 11/316,699, filed Dec. 22, 2005, entitled "Building Automation System Facilitating User Customization"; U.S. patent application Ser. No. 11/316,702, filed Dec. 22, 2005, entitled "Building Automation System Facilitating User Customization"; U.S. patent application Ser. No. 11/316,695, filed Dec. 22, 2005, entitled "Building Automation System Data Management"; U.S. patent application Ser. No. 11/316,697, filed Dec. 22, 2005, entitled "Building Automation System Data Management"; U.S. patent application Ser. No. 11/316,698, filed Dec. 22, 2005, entitled "Building Automation System Data Management"; U.S. patent application Ser. No. 11/316,703, filed Dec. 22, 2005, entitled "Building Automation System Data Management"; and U.S. patent application Ser. No. 11/316,410, filed Dec. 22, 2005, entitled "Dynamically Extensible and Automatically Configurable Building Automation System and Architecture," all of which are assigned to the assignee of the claimed inventions, and are herein incorporated by reference.

The invention can be more readily understood by reference to FIGS. 1-9 and the following description. While the invention is not necessarily limited to the specifically depicted application(s), the invention will be better appreciated using a discussion of exemplary embodiments in specific contexts.

In one exemplary embodiment, a BAS is capable of supporting and integrating legacy, current, and next generation components and subsystems. The BAS is further able to support common vendor or manufacturer systems as well as competitor systems by intelligently identifying the systems and/or subsystems and facilitating integration into the dynamically extensible BAS networks. This flexibility enables the system to support added applications, new devices and subsystem types and versions, to extend, customize, and tailor the management of BAS networks to specific needs in a particular implementation. Further, dynamic network extensibility enables a complex system to provide enhanced versatility and usability to an end user. In the exemplary embodiment described below, each BAS network can be compatible with one of the several versions of the BACnet™ protocol. Those skilled in the art will appreciate that other protocol implementations can also be utilized.

Referring to FIG. 1, a BAS Management System 10 according to one embodiment of the invention, comprises an ESE 20 preferably located at a central location 12 such as a headquarters or control station. ESE 20 comprises a single local management device in one embodiment. In another embodiment, ESE 20 comprises a multiple server configuration operating in a local or distributed environment. "Central" location 12, as understood by those skilled in the art, is not necessarily a geographic center but rather a communicative or control-based location in one embodiment from which it is convenient or feasible to manage BAS 10. For example, a user can manage one or more BAS installations at locations nationwide or within a region from a single headquarters location.

ESE 20 is preferably locally networked at location 12 and communicatively coupled to the Internet and/or intranet 30 and therefore can provide access and management control from virtually any location via a client terminal 22, internal or external to the location 12. ESE 20 and BAS network 14 need not be web-based or communicatively coupled to the Internet 30 as shown in FIG. 1, as other options known to those skilled in the art exist. The Internet and/or Intranet 30 or another local area network (LAN) 16 or wide area network (WAN) facilitate communications between ESE 20 and client terminals 22, as well as any BAS network(s) 14. Some or all communications and connections may be either wired or wireless within portions of BAS network 14 or between the BAS management system 10 sever or client elements as needed or desired.

Each implementation of BAS management system 10 can vary substantially by size, composition of devices, and balance of present, legacy, and future generation devices. Management system 10 can also vary by vendor/manufacturer, type, physical layout of building and/or campus, user needs, and other characteristics. Therefore, each implementation of management system 10, and ESE 20 in particular, is done on a site-by-site basis. ESE 20 can recognize, communicate with, and control a variety of system devices, including present generation and common manufacturer, legacy or previous generation, and competitor controllers and building automation devices across multiple BAS networks 14. System 10, via ESE 20, can also expand to integrate next-generation devices 46.

As depicted in FIG. 1, for example, a local supervisory controller 40, such as a Building Control Unit manufactured by TRANE®, can be communicatively coupled to the Internet and/or intranet 30, or directly communicatively coupled to a BAS network 14. The exemplary BAS network protocol BACnet™ shown in FIG. 1 includes a variety of end devices 42. Competitive products 44 can also be directly coupled to the BAS network 14. ESE 20 is further able to support future product(s) 46, such as updated versions of current controllers, newly developed products, and the like.

Each product, panel, device, or unit, including device 42, supervisory controller 40, legacy unit(s), competitive product(s) 44, and future product(s) 46, is modelled as and generally referred to herein throughout as a device in the context of exemplary management system 10. Referring to system 10, a device may encompass virtually any type or piece of equipment, or any input or output point, in system 10. An "end device" is generally referred to herein as a device located on a single BAS network subnet and is typically not a device capable of controlling other devices, although an end device normally includes a minimum networking communication capability. A "BAS network" is generally referred to herein as a collection of building automation system devices that share a logical or physical relationship and are either directly coupled to a common bus or network, or can communicate across sub-nets via a local routing device. One example of a BAS network is a collection of interconnected devices compatible with the ANSI/ASHRE standard 135-2008, BACnet—A Data Communication Protocol for Building Automation and Control Networks, hereinafter "BACnet". Each interconnected device is a peer of every other device on the network and each has a unique device identifier.

Figure 2:
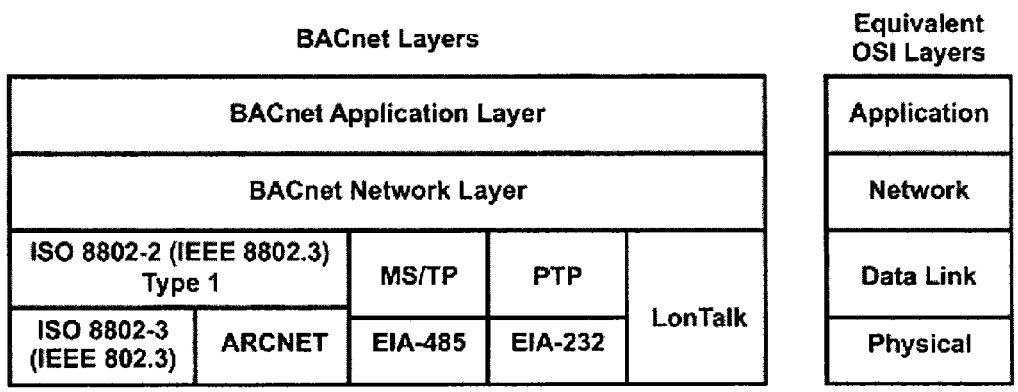
FIG. 2 is a depiction of the BACnet and OSI protocol layers.

FIG. 2 depicts the four layers of the BACnet protocol and their corresponding OSI layers. As shown, the exemplary BAS network protocol BACnet™, operates in the Application and Network OSI layers. Because it operates above the Physical and Data Link OSI layers, the BACnet™ protocol can be used in conjunction with a variety of lower layer networking protocols such as Ethernet or LonTalk. One example of the BACnet protocol flexibility is the BACnet over IP or BACnet/IP extension to the BACnet™ standards that allows BACnet network data to be transferred over an Internet compatible UDP/IP or TCP/IP network.

Figure 3:
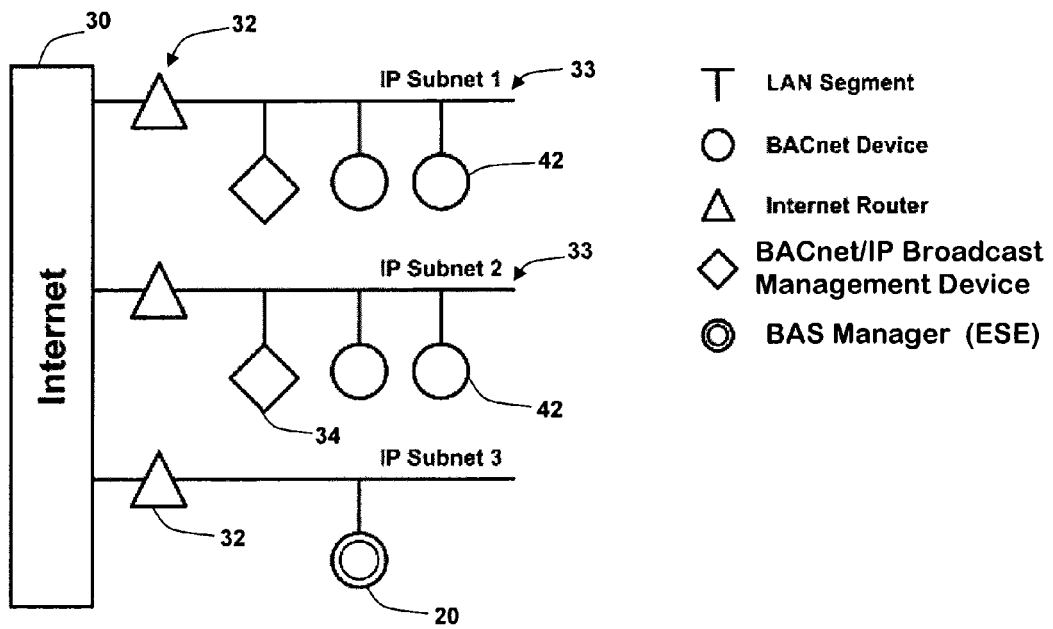
FIG. 3 is a diagram of a BAS Manager connected to two different BAS networks via the Internet according to one embodiment of the invention.

As depicted in FIG. 3, one approach to connecting multiple BAS networks together includes placing an internet router 32 between each sub-network 33 and the Internet 30. This approach also typically includes the placement of a BACnet/IP Broadcast Management Device (BBMD) 34 on each sub-network 33 to manage and translate any data received from outside of each specific sub-network 33 into a format that is compatible with the network expectations of end devices 42 and to provide support for broadcast functionality or services if the BAS network devices 42 do not support those services.

Figure 4:
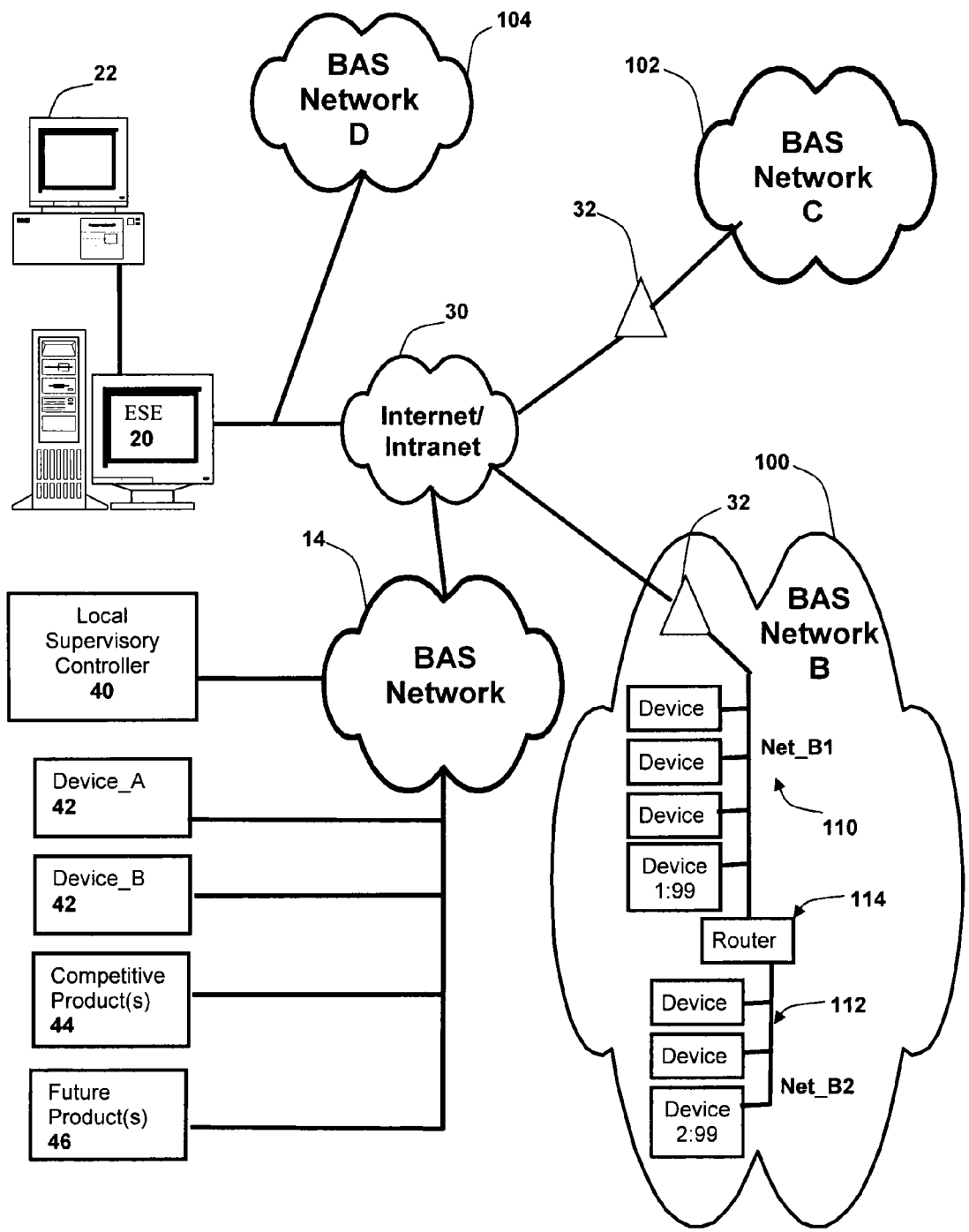
FIG. 4 is a network topology diagram of a single BAS Enterprise Server Engine coupled to multiple BAS networks according to one embodiment of the invention.

FIG. 4 depicts an exemplary embodiment of a BAS system that can provide centralized management of multiple BAS networks. In the situation where multiple BAS network protocols, or different versions of a common protocol, such as the BACnet™ protocol, are in use on different BAS networks the ESE 20 can seamlessly communicate with each BAS network protocol and version. As depicted, four different BAS networks (14, 100, 102, 104) are coupled either directly, or through an intranet or the Internet 30, to an ESE 20 network manager. The ESE 20 network manager can be a server class platform capable of supporting and maintaining communications with multiple networks and devices.

The first BAS network 14 is similar to that depicted in FIG. 1 with a variety of devices coupled together. In this example, the ESE 20 can be configured to seamlessly communicate with and manage the additional BAS networks (100, 102, 104). BAS network 100 comprises two subnets, Net_B1 (110) and Net_B2 (112). Subnets Net_B1 (110) and Net_B2 (112) are coupled with a local router 114 that acts as a bridge or switch between the end devices located on the two subnets. As shown in FIG. 3, BAS Network_B 100, along with BAS Network_C 102 can be connected to ESE 20 via the Internet 30 through internet routers 32. Additional BAS networks can also be connected, subject only to the processing and network bandwidth capacity of ESE 20 and the corresponding network or intranet components.

Figure 5:
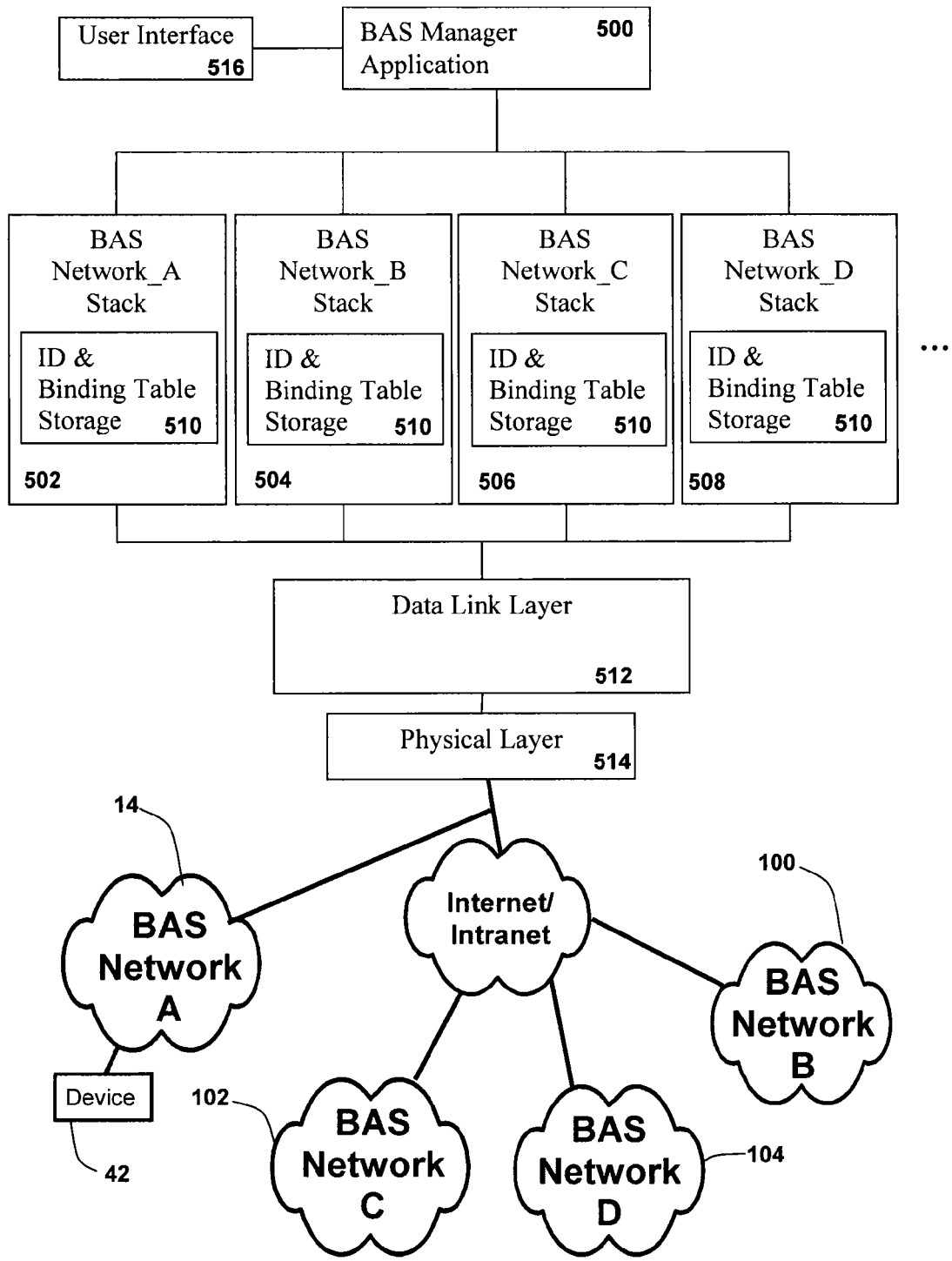
FIG. 5 is a diagram of a BAS ESE coupled to multiple networks according to one embodiment of the invention.

FIG. 5 depicts an exemplary embodiment of a network connection manager implemented in ESE 20 and configured to support the four BAS networks of FIG. 4. Unlike a typical OSI layer protocol stack, or a single BACnet™ manager protocol stack, the BAS network management system 10 can instantiate a BAS protocol stack (502, 504, 506, 508) for each BAS network (14, 100, 102, 104). This implementation can utilize one or more compatible physical layer connections 514 and data link protocols 512, such as UDP/IP or TCP/IP, and a single centralized BAS management application 500 to simultaneously support multiple BAS protocols that would otherwise be incompatible due to differences in implementation or version, or conflict due to overlapping individual device identifiers. The data link layer 512 can include an physical address resolution protocol table or map that can package and route messages or data packets from each individual BAS protocol stack (502, 504, 506, 508) to its respective BAS network (14, 100, 102, 104) location or Internet address. The BAS management application 500 can provide a user interface 516, preferably a graphical user interface, to an end user that allows the user to manage and control end device(s) 42 on each of the separate BAS networks from a common location and interface.

FIG. 6 is an exemplary diagram of the ESE network manager device identifier and peer device address binding table storage 510 for each multiple BAS protocol stacks according to one embodiment of the invention. While FIG. 6 depicts the device identifier and binding table storage in a tabular format, an alternative embodiment as shown in FIG. 5 can be implemented where each protocol stack stores the information depicted in a single column of FIG. 6.

Unlike a network router or BBMD device that simply provides a gateway or bridge between BAS networks, the BAS network manager can become an active peer device on each network coupled to the ESE 20. In the example of the BACnet™ network, each device has a unique device identifier. With the implementation of separate stacks for each BAS network, the network manager ESE 20 can maintain a unique device identifier on each network. For example, on BAS network_A 14, the ESE 20 can connect to an open socket configured on an interface to network_A 14 and appear as device id "1:100" to all of the peer devices that are members of network_A 14. On BAS network_B 104 the same ESE 20 BAS network manager can appear as device "1:47" on subnet Net_B1 (110) and, depending on the configuration of the local subnet router 114, as device "2:48" to peer devices that are members of subnet Net_B2 (112). As shown in exemplary FIGS. 5 and 6 each BAS protocol stack can maintain a separate device identifier and table of peer devices on each BAS network. Preferably the BAS network manager can be configured to attempt to establish an identity on each BAS network with a default device identifier, but as illustrated, the network manager can utilize any identifier value as necessary if a device on a new BAS network is already assigned to that default value.

In addition to maintaining an individual device identifier for each BAS networks, the BAS network manager can also maintain separate device address binding tables for each BAS network. A device address binding table can act as a dynamically updated map or listing of each end device that is connected to an individual BAS network. The use of separate device identifiers, binding tables, and protocol stacks allows the BAS network manager to be configured to support any of a wide variety of BAS network protocols and multiple versions of any such protocol with a dedicated protocol path customized for each protocol and version as needed. As shown in the exemplary binding table for the Network_B stack in FIG. 6, the BAS network manager can differentiate between devices on different subnets in a single BAS network by storing both the subnet and the device identifier. One example is shown in FIGS. 4 and 6 where two discrete devices on BAS Network_B 100 are both assigned device identifier "99." As depicted in FIG. 6 the BAS network manager can store the logical BAS network address in the subnet:device_id format enabling the BAS network manager ESE 20 to communicate with either device in the single BAS network.

Figure 7:
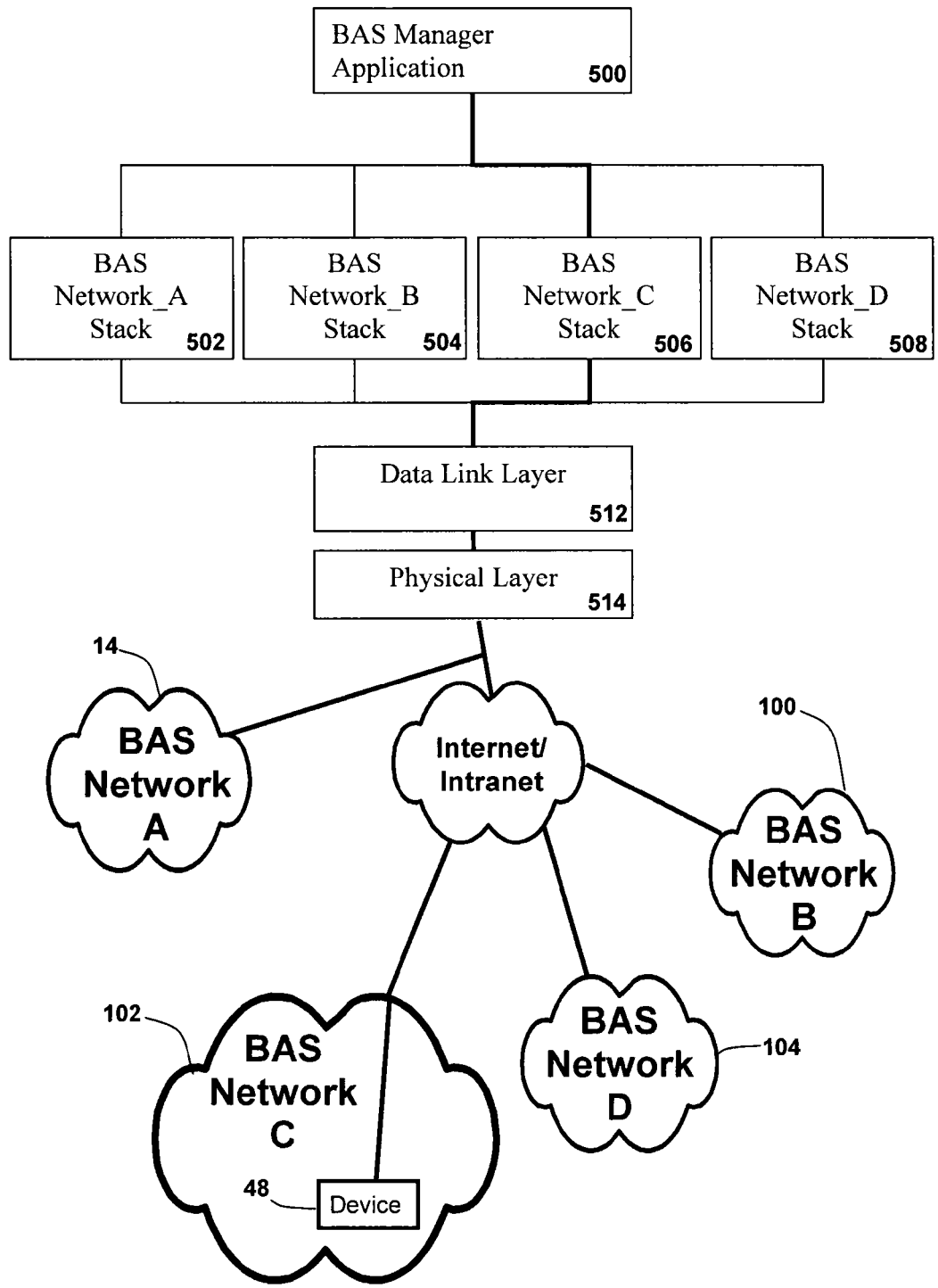
FIG. 7 is diagram of a communication path between a BAS Manager and a BAS network end device.

FIG. 7 depicts an exemplary path to end device 48 when a command from a BAS user interface traverses from ESE 20 through the BAS manager. In an exemplary system where each of several BAS networks, each connected to a central BAS network manager, comprise the building controls for several geographically distributed retail outlets, a user may desire to change one or more settings or conditions in each building. One example is of a single command issued by a user at a client terminal 22, replicated and iteratively distributed, can direct an appropriate end device such as a HVAC controller in each building to change the length of time one or more conditions are maintained. This program change can, for example, configure the HVAC system to maintain a preset environmental state for a period of time in order to accommodate an extended hours event such as a holiday sale. While a user command can include the direction to continue running an open_store program until 7 PM, instead of normal closing time of 5 PM, the actual message or data packets delivered to each HVAC controller would be appropriately customized by the BAS network manager. This customization occurs as each message traverses the protocol stack corresponding to each respective network. Each message includes the corresponding device identifier as the message originator obtained from the device ID storage, and an appropriate target or destination field retrieved from the associated device address binding table for each BAS network.

Figure 8:
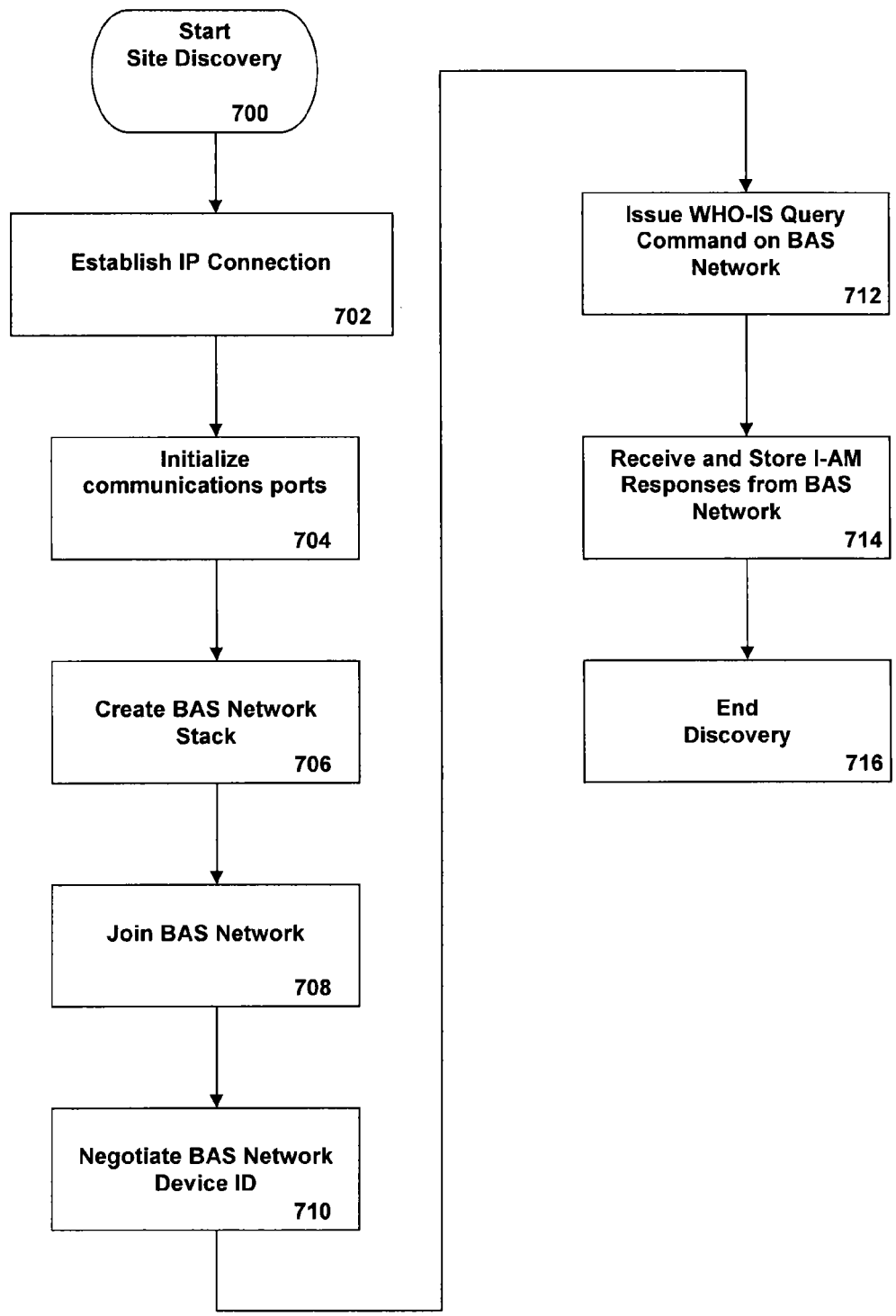
FIG. 8 is a flow chart of an exemplary process of discovering a BAS network according to one embodiment of the invention.

FIG. 8 depicts a flow chart of an exemplary process for discovering devices connected to a BAS network. The ESE 20 can start an internal BAS network-manager site discovery process 700 that is configured to query each connected BAS network for any compatible devices. The BAS network manager can establish an IP connection 702, or other supported data-link layer connection, to the router or gateway device on each BAS network that is configured to support a remote management connection. Once a communication port is established 704 with the BAS network the BAS network manager can create a compatible BAS network stack 706 based on the protocol and version information that is preferably supplied by the newly connected BAS network, or manually configured by a user. The BAS network manager then attempts to use a default BAS network device identifier to join the BAS network 708 or negotiates for an available device id 710. Once the BAS 20 is a connected device on the BAS network it can interrogate the network for peer devices by transmits a Who-Is command 712 to the BAS network. The receipt of I-Am messages 714 for each peer device on the BAS network can be used to populate the device address binding table for each BAS network and completes the discovery process 716.

Figure 9:
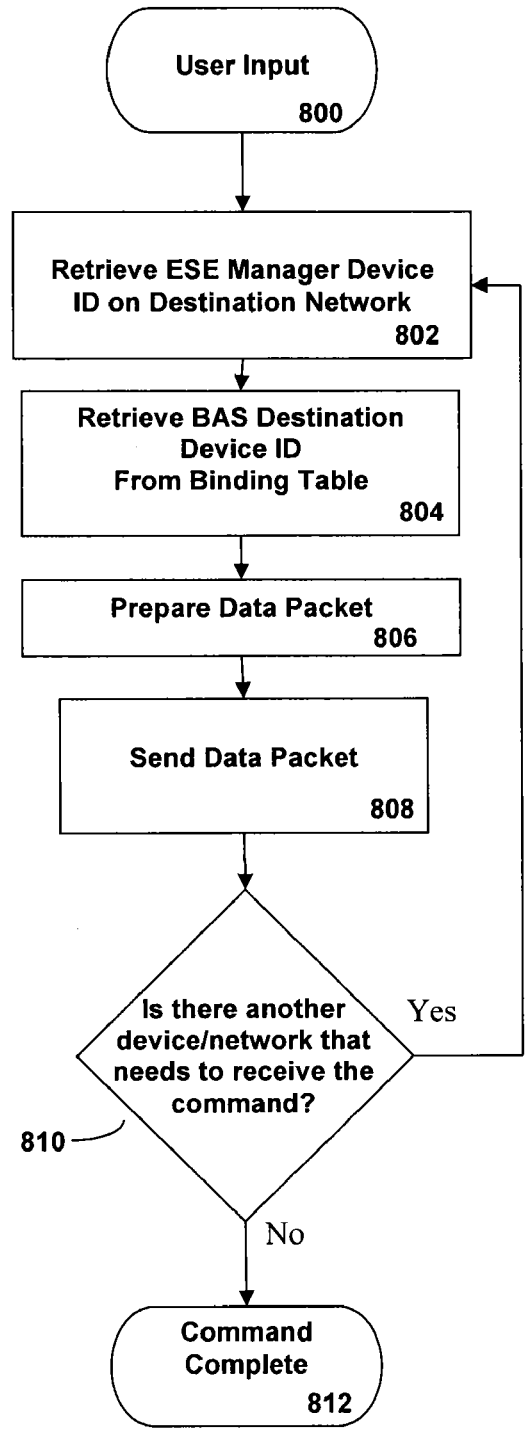
FIG. 9 is a flow chart of an exemplary process of presenting a single command to multiple BAS end devices on multiple BAS networks.

FIG. 9 is a flow chart of an exemplary process of presenting a single input command 800 from a user to multiple BAS end devices on multiple BAS networks. The BAS manager first determines the target network and retrieves 802 the BAS network manager's device identifier for that BAS network from the appropriate BAS network stack. The destination device identifier is also retrieved 804 from the same BAS network stack. Once the source and destination information is known the data packet can be prepared for transmission 806 by encapsulating it with the appropriate data link layer protocol header or padding and then transmitted out over the physical network 808. The BAS network manager then can determine 810 based on the content and format of the user's original input, as in the case of a single command being directed to multiple devices on multiple networks, if another device or network needs to receive the command. If another data packet transmission is needed the BAS network manager repeats the previous sequence until all devices have been notified and the command is complete 812. If a response is expected or required to be received from the individual recipient devices, the BAS manager can be configured to receive response messages or packets in separate queues for each BAS network stack in parallel as they are received.

The foregoing descriptions present numerous specific details that provide a thorough understanding of various embodiments of the invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention. It is manifestly intended that this invention be limited only by the following claims and equivalents thereof.

For purposes of interpreting the claims for the present invention, it is expressly intended that the provisions of Section 112, sixth paragraph of 35 U.S.C. are not to be invoked with respect to a given claim unless the specific terms "means for" or "step for" are recited in that claim.

All of the patents and patent applications disclosed herein, including those set forth in the Background of the Invention, are hereby incorporated by reference. Any incorporation by reference of documents above is limited such that no subject matter is incorporated that is contrary to the explicit disclosure herein. Any incorporation by reference of non-priority documents above is further limited such that no claims included in the documents are incorporated by reference herein and any definitions provided in the documents are not incorporated by reference herein unless expressly included herein.

The invention claimed is:

1. A method of integrating a plurality of building automation system (BAS) networks comprising:
communicatively coupling each of the plurality BAS networks to a central server engine;
configuring the server engine to communicate with each of the plurality of BAS networks by providing a protocol stack for a BAS network protocol compatible with at least one of the plurality of BAS networks;
storing a BAS network device identifier associated with the server engine for the at least one of the plurality of BAS networks in the protocol stack; and
storing a device address binding table including the BAS network address of each of a plurality of devices connected to each of the plurality BAS networks in the protocol stack for each of the plurality of BAS networks.

2. The method of claim 1, wherein the at least one of the plurality of BAS networks is a BACnet compatible network.

3. The method of claim 1, wherein the central server engine is communicatively coupled to the at least one of the plurality BAS networks by an interne protocol compatible network.

4. The method of claim 3, wherein the internet protocol compatible network is the Internet.

5. A method for managing a plurality of building automation systems (BAS) having at least two incompatible building automation system networks comprising:
communicatively coupling the at least at least two incompatible building automation system networks to an router configured to encapsulate data traffic from each of the at least at least two incompatible building automation system networks onto a third network;
communicatively coupling a building automation system network manager engine to the third network;
parsing the data traffic from each of the at least two incompatible building automation system networks into at least two separate network level protocol stacks;
storing a network device identifier associated with the building automation system network manager engine in each of at least two separate network level protocol stacks; and
storing a device address binding table including a network address of each of a plurality of devices connected to each of the least two incompatible building automation system networks in each of at least two separate network level protocol stacks.

6. The method of claim 5, wherein at least one of the at least two incompatible building automation system networks is a BACnet compatible network.

7. The method of claim 5, wherein the third network is an interne protocol compatible network.

* * * * *